US007357423B2

(12) United States Patent
Fabel et al.

(10) Patent No.: US 7,357,423 B2
(45) Date of Patent: Apr. 15, 2008

(54) MULTI-LABEL MAILING FORM INCLUDING CERTIFIED SELF-MAILER

(75) Inventors: Warren M. Fabel, Boca Raton, FL (US); Jose B. Cortez, Boynton Beach, FL (US); Glen A. Auchter, Parkland, FL (US)

(73) Assignee: Laser Substrates, Inc., Boca Raton, FL (US)

(*) Notice: Subject to any disclaimer, the term of this patent is extended or adjusted under 35 U.S.C. 154(b) by 682 days.

(21) Appl. No.: 10/740,071

(22) Filed: Dec. 18, 2003

(65) Prior Publication Data

US 2004/0130141 A1 Jul. 8, 2004

Related U.S. Application Data

(63) Continuation-in-part of application No. 10/378,163, filed on Feb. 28, 2003, now Pat. No. 6,945,565, and a continuation-in-part of application No. 10/255,375, filed on Sep. 26, 2002, now abandoned, which is a continuation-in-part of application No. 09/293,496, filed on Apr. 15, 1999, now Pat. No. 6,717,938.

(51) Int. Cl.
*B42D 15/00* (2006.01)
*B23B 9/00* (2006.01)
*B65D 27/00* (2006.01)

(52) U.S. Cl. .................... 283/101; 229/92.1; 229/92.3; 283/116; 428/40.1; 428/42.3

(58) Field of Classification Search ................ 283/100, 283/101, 106, 116; 40/310; 428/40.1, 41.7, 428/41.8, 41.2, 42.3; 229/92.1, 92.3; 493/917, 493/961, 63, 79, 216
See application file for complete search history.

(56) References Cited

U.S. PATENT DOCUMENTS

| | | | | | |
|---|---|---|---|---|---|
| 2,405,327 | A | * | 8/1946 | Rend | 229/92.1 |
| 3,061,173 | A | * | 10/1962 | Sawdon | 229/300 |
| 3,666,926 | A | * | 5/1972 | Conte et al. | 235/487 |
| 4,199,630 | A | * | 4/1980 | Consiglio | 428/43 |
| 4,375,868 | A | * | 3/1983 | Slotar et al. | 229/92.3 |
| 4,502,713 | A | * | 3/1985 | Conti | 283/116 |
| 4,927,072 | A | * | 5/1990 | Jenkins et al. | 229/92.3 |
| 4,948,028 | A | * | 8/1990 | Vollowitz | 229/80 |
| 4,981,251 | A | * | 1/1991 | Jenkins et al. | 229/92.3 |

(Continued)

*Primary Examiner*—Monica Carter
*Assistant Examiner*—Michael W. Talbot
(74) *Attorney, Agent, or Firm*—Jon A. Gibbons; Fleit Kain Gibbons Gutman Bongini & Bianco P.L.

(57) ABSTRACT

A mailing form for facilitating the mailing of a document is disclosed. The mailing form includes a bottom ply of the mailing form and an interspersed between the first side of the bottom ply (i.e. inner side of the bottom ply) and the second side of the top ply (i.e. inner side of top ply). The mailing form further includes a top ply of the mailing form and a removable portion of the top ply extending over the first side of the top ply. The mailing form further includes a vertical fold line for folding the mailing form after the top ply has been removed, and a horizontal strip of the first side of the bottom ply, the horizontal strip including adhesive that is exposed after the mailing form is folded. The mailing form further includes a horizontal fold line for folding the mailing form that has been folded along the vertical fold line.

12 Claims, 12 Drawing Sheets

U.S. PATENT DOCUMENTS

| | | | | | |
|---|---|---|---|---|---|
| 5,174,491 | A | * | 12/1992 | Taylor et al. | 229/92.1 |
| 5,288,015 | A | * | 2/1994 | Sauerwine | 229/305 |
| 5,472,240 | A | * | 12/1995 | Davies | 283/116 |
| 5,501,393 | A | * | 3/1996 | Walz | 229/92.8 |
| 5,509,694 | A | * | 4/1996 | Laurash et al. | 283/81 |
| 5,595,404 | A | * | 1/1997 | Skees | 283/116 |
| 5,687,495 | A | * | 11/1997 | Volkert | 40/124.08 |
| 5,687,904 | A | * | 11/1997 | Potter | 229/303 |
| 5,704,650 | A | * | 1/1998 | Laurash et al. | 283/81 |
| 6,092,317 | A | * | 7/2000 | Volkert | 40/124.08 |
| 6,209,920 | B1 | * | 4/2001 | Fabel | 283/62 |
| 6,461,063 | B1 | * | 10/2002 | Miller et al. | 400/76 |
| 6,510,980 | B2 | * | 1/2003 | Halbrook et al. | 229/92.1 |
| 6,945,565 | B2 | * | 9/2005 | Fabel | 283/105 |
| 2001/0002679 | A1 | * | 6/2001 | Fabel | 229/313 |
| 2004/0066032 | A1 | * | 4/2004 | Fabel et al. | 283/61 |
| 2005/0145682 | A1 | * | 7/2005 | Auchter et al. | 229/92.1 |
| 2006/0048422 | A1 | * | 3/2006 | Dyvig et al. | 40/654.01 |
| 2006/0138768 | A1 | * | 6/2006 | Abaygar et al. | 283/106 |

* cited by examiner

MULTI-LABEL MAILING FORM INCLUDING CERTIFIED SELF-MAILER

CROSS-REFERENCED APPLICATIONS

This non-provisional application is a continuation-in-part of the non-provisional patent application Ser. No. 10/378,163 with inventor Warren Fabel entitled "MULTI-LABEL MAILING FORM FOR NON-IMPACT PRINTER" filed Feb. 28, 2003, now U.S. Pat. No. 6,945,565 which is hereby incorporated by reference in its entirety. This non-provisional application is also a continuation-in-part of the non-provisional patent application Ser. No. 10/255,375 with inventor Warren Fabel entitled "SINGLE SIDE IMAGED POSTAL FORM ASSEMBLY" filed Sep. 26, 2002, now abandoned which is hereby incorporated by reference in its entirety. Both of the aforementioned non-provisional applications are continuation-in-part applications of the non-provisional patent application Ser. No. 09/293,496 with inventor Fabel entitled "SINGLE-SIDE IMAGED POSTAL FORM ASSEMBLY" filed Apr. 15, 1999, now U.S. Pat. No. 6,717,938 which is hereby incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of mailing forms and more specifically to mailing forms that can be folded to include a document firmly situated inside the mailing form when in folder configuration.

2. Description of Related Art

As technology progresses, the business office is becoming more and more automated. Faxes, file servers, email, teleconferencing and cell phones have revolutionized the way firms do business. Self-mailing documents, in particular, have enjoyed increasing popularity. A self-mailer is a consumable paper product that allows for quick and easy printing and mailing of information. A self-mailer can include an envelope, an insert and a return envelope, which may be created by folding the original document. For example, self-mailers are used to send account statements, invoices, checks, to customers and employees of a business. The commonly owned U.S. patent applications described above provide more information on self-self-mailers. A self-mailer allows a firm or business to print directly onto one product all of the information necessary for mailing to a customer, client or employee. This is advantageous as it eliminates the separate printing of an envelope, an insert and a return envelope, as well as the need for the insertion of the return envelope and the insert into the envelope. Self-mailers, however, do not come without their drawbacks.

One problem is producing the self-mailer. Self-mailers often require folding and sealing before sending out. Current folding/sealing machines are bulky and costly. Thus, businesses are forced to buy additional equipment, apart from software and printers, in order to produce a self-mailer. This is cost prohibitive for many businesses. Therefore, a need exists to provide a cost effective method of producing self-mailers for small and medium businesses.

Another problem with the production of self-mailers is that current business form printing software requires duplex or multiple pass printers. This is disadvantageous, as the current installed base of printers substantially comprises simplex or single pass printers. It would be advantageous for business form printing software to support the current installed base of single pass printers (simplex), as it is cost effective for those recipients to continue using their current printers, as opposed to purchasing new printers. Therefore, a need exists for a business form printing system that supports simplex or single pass printers.

Non-impact printers, such as laser or ink jet printers, are being increasingly used to provide a fast, economical, and convenient method of printing data on various media, including self-mailers. Multi-part forms, including envelopes in which documents are sent, together with the documents themselves, have been manufactured for use in impact printers. Such forms are typically assembled into webs with sprocket holes extending along one or both lateral edges to facilitate handling through a pin feed impact printer. Transferable coatings are selectively placed on one or more of the sheets making up the assembly, so that impact-printing forces are transferred to produce characters on intermediate document surfaces. This approach has further been modified to provide a remittance envelope, in which various materials, such as a check and a portion of the statement, may be returned to the organization sending the statement.

However, with the increasing popularity of non-impact printers, especially among small business organizations, the percentage of organizations having the impact printers necessary to use such multi-part forms is decreasing. Therefore, what is needed is a self-mailer configured for use with non-impact printers. However, by simply adapting the standard available technologies to produce forms that can be used with non-impact printers results in forms that do not have flexibility and the capability for efficient use with non-impact printers. For example, impact self-mailers produced by machine-fold and seal technologies available in the 1980s and 1990s were often burdensome or clumsy to open. A perforated strip had to be removed from at least three, and sometimes four, sides of the mail piece. At least two of these strips ran at right angles to the paper grain whereby perforations are least effective for providing a clean tear.

Furthermore, previously available self-mailers often must be processed through automatic folding/sealing machines to be used in a practical manner. Such automatic folding machines are examples of equipment not available to many small business organizations.

Currently, there is no efficient solution to handle information where a notice, announcement or other information typically printed on an information postcard is sent via Certified Mail. Information postcards are used in many situations to satisfy notice requirements under local, state and federal laws. These notice requirements vary from eviction notices and parking violations, to satisfying a lien against equipment and/or belongings. In this example, the sender of the information document must match up the document to the requirements of Certified Mail. This is time consuming and prone to errors. Specifically, a user must manually fill out the "Certified Mail Postcard" (United States Postal Service Form 3811 and often referred to as Registered Mail in non-U.S. Countries) and the "Receipt for Certified Mail" (United States Postal Service Form 3800) are manually filled out or printed separately from the information post card.

Therefore, a need exists to overcome the problems with the prior art as discussed above.

SUMMARY OF THE INVENTION

Briefly, in accordance with the present invention, disclosed is a mailing form for facilitating the mailing of an information post card or information document combined with "Certified Mail Postcard" (United States Postal Service Form 3811 and often referred to as Registered Mail in non-U.S. Countries) and the "Receipt for Certified Mail" (United States Postal Service Form 3800). In an embodiment of the present invention, the mailing form includes a bottom ply of the mailing form and an adhesive interspersed between the first side of the bottom ply (i.e. the inner side of the bottom ply) and the second side of the top ply (i.e. the inner side of the top ply). The mailing form further includes a top ply of the mailing form located on top of the bottom ply and a removable portion of the top ply extending over the first side of the top ply, such that removal of the removable portion exposes the adhesive. The mailing form further includes document information printed on the second side of the bottom ply. The mailing form further includes a vertical fold line for folding the mailing form after the top ply has been removed, the adhesive securing the mailing form when folded along the vertical fold line and a horizontal strip of the first side of the bottom ply (i.e. the inner side of the bottom ply), the horizontal strip including adhesive that is exposed after the mailing form is folded along the vertical fold line. The mailing form further includes a horizontal fold line for folding the mailing form that has been folded along the vertical fold line, the adhesive of the horizontal strip securing the mailing form when folded along the horizontal fold line. When the mailing form is in folder configuration, the document information is firmly situated within the mailing form as required by the United States Postal Service (USPS).

In an embodiment of the present invention, the mailing form further includes a first perforation along the top margin of the top ply and the bottom ply and a second perforation along the bottom margin of the top ply and the bottom ply. The first perforation and the second perforation can be torn when the mailing form is in folder configuration, such that the mailing from can be unfolded along the horizontal fold line.

In an embodiment of the present invention, a method for facilitating the mailing of a document is further disclosed. The method includes providing a mailing form comprising a bottom ply, a top ply located on top of the bottom ply, and an adhesive interspersed between the first side of the bottom ply (i.e. the inner side of the bottom ply) and the second side of the top ply (i.e. inner side of the top ply). The method further includes printing document information on the second side of the bottom ply and removing a removable portion of the top ply extending over the first side of the top ply, such that removal of the removable portion exposes the adhesive. The method further includes folding the mailing form along a vertical fold line after the top ply has been removed, the adhesive securing the mailing form when folded along the vertical fold line. A horizontal strip of the first side of the bottom ply (i.e. the inner side of the bottom ply) is exposed after the mailing form is folded along the vertical fold line, the horizontal strip including adhesive. The method further includes folding the mailing form along a horizontal fold line, the adhesive of the horizontal strip securing the mailing form when folded along the horizontal fold line. When the mailing form is in folder configuration, the document information is firmly situated within the mailing form.

In an embodiment of the present invention, the method further includes tearing a first perforation running along the top margin of the top ply and the bottom ply and a second perforation running along the bottom margin of the top ply and the bottom ply when the mailing form is in folder configuration, such that the mailing from can be unfolded along the horizontal fold line.

The features of the present invention are advantageous as all printed information is printed on one face of the self-mailer and thus it allows the self-mailer to be printed in a typical sheet-fed non-impact printer. Additionally, it allows the postage indicia and Facing Identification Mark to be printed within ⅛ of an inch of the top edge of an envelope, as required by the U.S. Postal Service (USPS). Further, it allows all of the text printed on the self-mailer to be printed in the same orientation. This simplifies the printing process and provides for an efficient allocation of resources.

Another advantage of the present invention is that a self-mailer, including a document such as a certified mail form, is provided with an attached "Receipt for Certified Mail" (United States Postal Service Form 3800). This embodiment of the present invention allows for the printing of the inserted document and the receipt at the same time and in one printer pass. This results in a quick and easy generation of the self-mailer and associated receipt.

Another advantage of the present invention is that the present invention eliminates the possibility of a mismatch between a document and a Certified Mail card. Since both items are printed onto the same self-mailer, there is no need to seek matching documents and collate them together. Instead, both items are printed onto the same self-mailer and folded and sealed together to produce an item that is mailed.

Another advantage of the present invention is that the self-mailer is easily printable by a standard non-impact printer. Printing of the self-mailer does not require the adjustment of the printer. This is beneficial to the consumer as it results in a more efficient printing process.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION OF THE PREFERRED EMBODIMENTS

The present invention solves the problems with the prior art by providing a self-mailer that (a) provides a combination of a information post card or information document combined with "Certified Mail Postcard" (United States Postal Service Form 3811 and often referred to as Registered Mail in non-U.S. Countries) and the "Receipt for Certified Mail" (United States Postal Service Form 3800) and (b) can be simplex printed to include all addressing and electronic PC postage, including Information-Based Indicia (IBI) and FIM indicia and automatic positioning of same, in a single pass through the simplex printer.

First Embodiment

Figure 1:
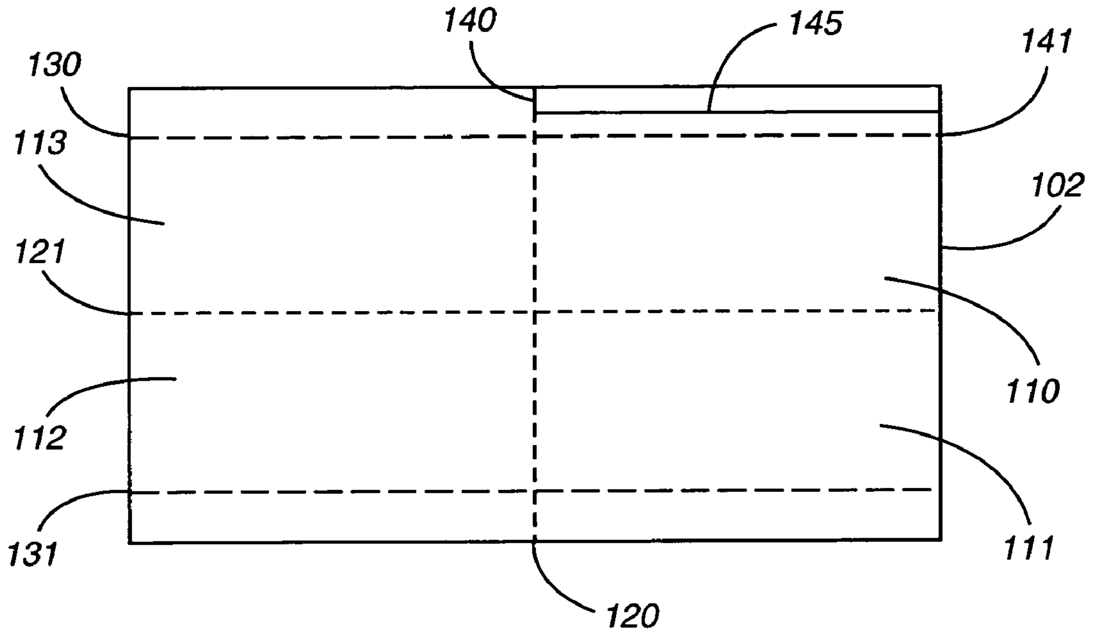
FIG. 1 shows the first side of a top ply of the mailing form in one embodiment of the present invention.

FIG. 1 shows the first side of a top ply 102 of the mailing form, or self-mailer, in one embodiment of the present invention. FIG. 1 shows that the top ply 102 is a rectangular sheet of paper having dimensions of a standard sheet of paper, e.g., 8.5×11 inches, 8.5×14 inches or A4. It is important to note, that other paper dimensions are possible to those skilled in the art, within the true scope and spirit of the present invention. The top ply 102 is composed of any number of paper materials and composites that are used as paper substitutes. The top ply 102 can receive printed information when passed through a simplex non-impact printer.

FIG. 1 shows that the top ply 102 includes a vertical fold line 120 that evenly divides the top ply 102 vertically in half. FIG. 1 also shows that the top ply 102 includes a horizontal fold line 121 that also evenly divides the top ply 102 in half, but horizontally. Thus, the first side of the top ply 102 is divided into four quadrants by the vertical fold line 120 and the horizontal fold line 121. FIG. 1 further shows that the top ply 102 includes a perforation 130 running along the top edge of the top ply 102 and a perforation 131 running along the bottom edge of the top ply 102.

FIG. 1 further shows that the top ply 102 includes a die cut 141 that runs along the top edge of the top ply 102 from vertical fold line 120 to the end of the top ply 102. In addition, the top ply 102 includes a die cut 140 that runs along the vertical fold line 120 from the top of the top ply 102 to the die cut 141. A die cut is a continuous or substantially continuous cut of a ply or sheet of paper. A perforation is a periodic series of small cuts or holes in a ply or sheet of paper. Various well-known form manufacturing processes can be used to form die cuts and perforations. In one embodiment, the fold lines 121 and 120 are perforations.

The fold lines, perforations and die cuts of the top ply 102 create various areas in the first side of the top ply 102. Area 110 is located in the top right quadrant of the top ply 102, bounded on the bottom by fold line 121, bounded on the left by fold line 120 and bounded on the top by perforation 130. Area 111 is located in the bottom right quadrant of the top ply 102, bounded on the bottom by perforation 131, bounded on the left by fold line 120 and bounded on the top by fold line 121. Area 112 is located in the bottom left quadrant of the top ply 102, bounded on the bottom by perforation 131, bounded on the right by fold line 120 and bounded on the top by fold line 121. Area 113 is located in the top left quadrant of the top ply 102, bounded on the bottom by fold line 121, bounded on the right by fold line 120 and bounded on the top by perforation 130. Horizontal strip 145 is located in the top right quadrant of the top ply 102, bounded on the bottom by die cut 141 and bounded on the left by die cut 140.

In one embodiment of the present invention, document information is printed on an informational postcard or information document can be printed in areas 110 and 111. The document information is information necessary to satisfy notice requirements under local, state and federal laws. These notice requirements vary from eviction notices and parking violations, to satisfying a lien against equipment and/or stored belongings. In another embodiment of the present invention, variable information can be printed in areas 112 and 113. The variable information can include, among other things, a sender address, a recipient address, postage indicia and a Facing Identification Mark (FIM—a symbol on envelopes used for facilitating the sorting and routing of mail). Postage indicia include stamp postage, tape postage, PC postage and the like.

In an embodiment of the present invention, postage indicia and FIM are printed in area 112 or 113 near fold line 121. The U.S. Postal Service (USPS) requires that postage indicia and FIM be printed within ⅛ of an inch of the top edge of an envelope. Many simplex printers have a border of non-printable area, commonly ¼" on all four sides. Typically, it is difficult, if not impossible, to program a sheet-fed printer to print data precisely near the top edge of paper, as the top edge is the first portion of the paper that is fed into the printer known as the gripper portion. If the postage indicia and FIM were located near the top of the top ply 102 (such as above the perforation 130), it would be problematic to print the postage indicia and FIM within ⅛ of an inch of the top edge of the top ply 102. Thus, the postage indicia and FIM are printed near the horizontal fold line 121, which is away from the edge of the sheet of the top ply 102.

Typically, it is possible to program a sheet-fed printer to print data precisely in areas away from the edges of the paper.

Note that the document information printed in the areas 110 and 111 and the variable information printed in areas 112 and 113 can be printed in a downwards-facing or in an upwards facing orientation.

The foregoing features of the present invention are advantageous as all printed information is printed on the first side of the top ply 102 and thus it allows the self-mailer to be printed in a typical sheet-fed non-impact printer. Additionally, it allows the postage indicia and FIM to be printed within ⅛ of an inch of the top edge of the mail piece, as required by the USPS.

Figure 2:
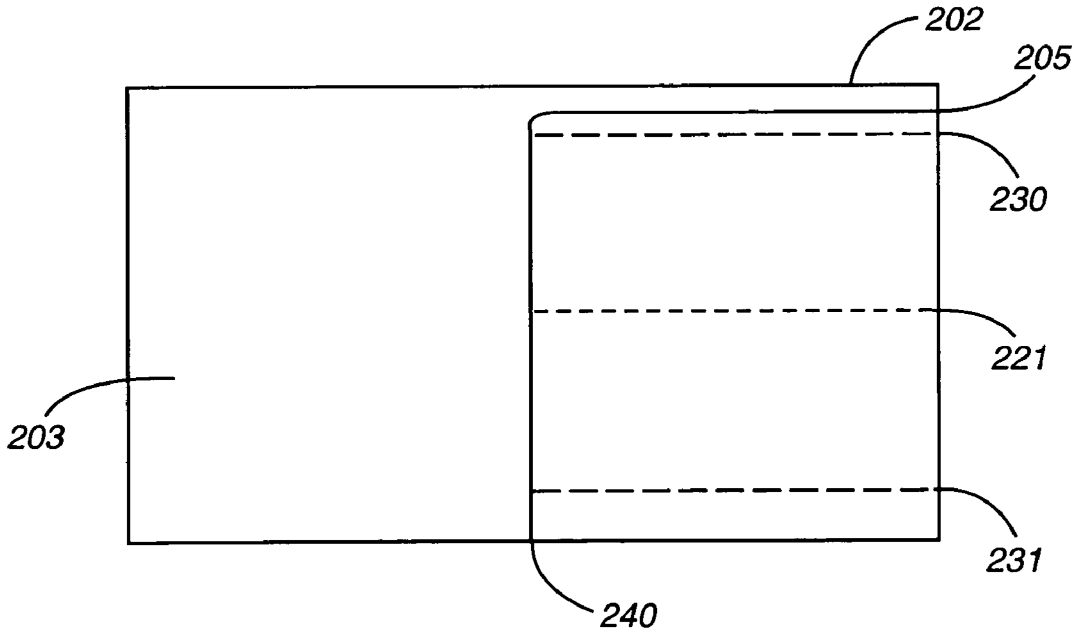
FIG. 2 shows the first side of a bottom ply (i.e. inner side of the bottom ply of the mailing form in one embodiment of the present invention.

FIG. 2 shows the first side of a bottom ply (i.e. inner side of the bottom ply) 202 of the mailing form in one embodiment of the present invention. The bottom ply 202 is of the same size and constitution as the top ply 102. As shall be seen below, the bottom ply 202 is manufactured for superimposing below, and lining up with, the top ply 102.

FIG. 2 shows a die cut 240 running along the vertical midsection of the bottom ply 202 and curving to the right to meet the right edge of the bottom ply 202. In another embodiment, there are other geometric angles or combinations of angles and curves that are used, such as a right-angle. The horizontal portion of the die cut 240 is referred to as die cut 205. FIG. 2 also shows a fold line 221 running along the horizontal midsection of the bottom ply 202, starting at the die cut 240 and extending to the right edge of the bottom ply 202. FIG. 2 further shows a perforation 230 running along the top edge of the bottom ply 202, starting at the die cut 240 and extending to the right edge of the bottom ply 202. FIG. 2 further shows a perforation 231 running along the bottom edge of the bottom ply 202, starting at the die cut 240 and extending to the right edge of the bottom ply 202.

Die cut 240 bounds the area of the removable portion 203 of the bottom ply 202. Because a die cut is a substantially continuous cut of the material that constitutes bottom ply 202, die cut 240 effectively disconnects the removable portion 203 from the rest of the bottom ply 202. The removable portion 203 and its functions are described in greater detail below.

When the top ply 102 is superimposed on top of bottom ply 202, the perforation 230 is collinear, that is it lies parallel, with the perforation 130, the perforation 231 is collinear with the perforation 131, the fold line 221 is collinear with the fold line 121 and a substantial portion of the die cut 240 is collinear with the fold line 120. Furthermore, die cut 205 is collinear with die cut 141.

Figure 3A:
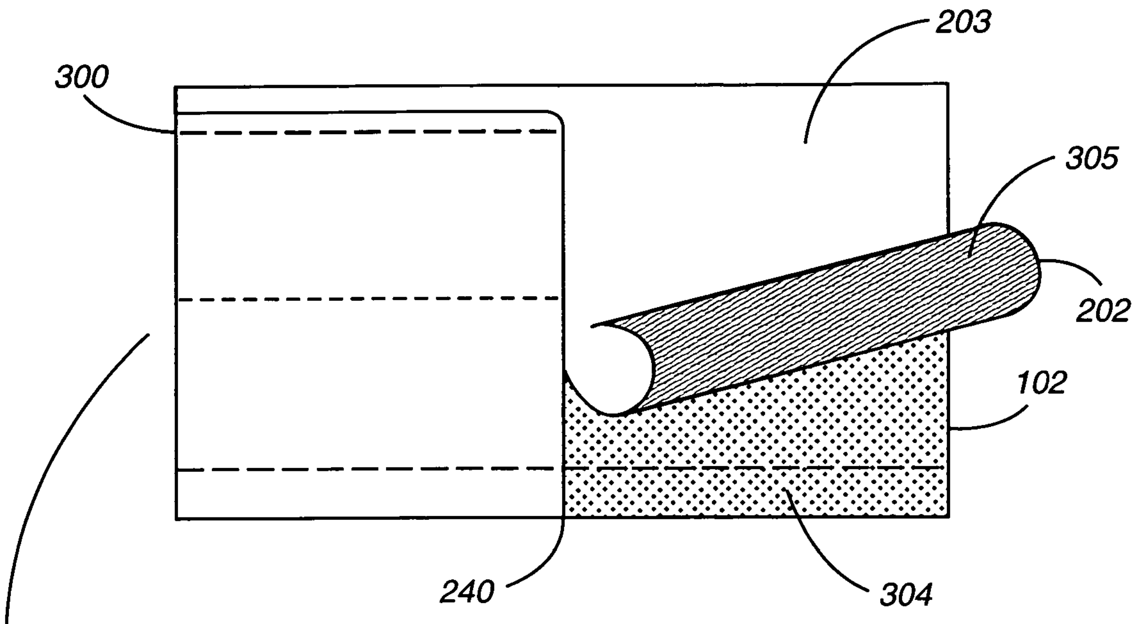
FIG. 3A shows the second side of the bottom ply (i.e. backside of the bottom ply of the mailing form in one embodiment of the present invention.

FIG. 3A shows the second side of the bottom ply (i.e. backside of the bottom ply) of the mailing form 300, or self-mailer, in one embodiment of the present invention. The mailing form 300 comprises the top ply 102 laid on top of the bottom ply 202 such that the first side of the inner side of the bottom ply 202 meets the second side of the top ply (i.e. inner side of the top ply) 102. FIG. 3A shows the second side of the bottom ply (i.e. backside of the bottom ply) 202, as the first side of the inner side of the bottom ply 202 is not visible due to the top ply 102 laying on top of the first side of the bottom ply 202. FIG. 3A also shows the second side of the top ply (i.e. inner side of the top ply) 102, visible only as the bottom ply 202 is peeled off.

As explained above, the die cut 240 bounds the area of the removable portion 203 of the bottom ply 202. Die cut 240 effectively dis-adheres or peels-off the removable portion 203 from the rest of the bottom ply 202. FIG. 3A shows that the removable portion 203 of the bottom ply 202 can be removed by peeling the removable portion 203 from the self-mailer 300. The first section of the removable portion 203 of the bottom ply 202 (i.e., that face of the removable portion 203 that contacts the top ply 102) is coated with a releasable substrate 305 such as silicon. Further, the area of the second side of the top ply (i.e. the inner side of the top ply) 102 that contacts the first section of the removable portion 203 is coated with an adhesive 304.

Figure 3B:
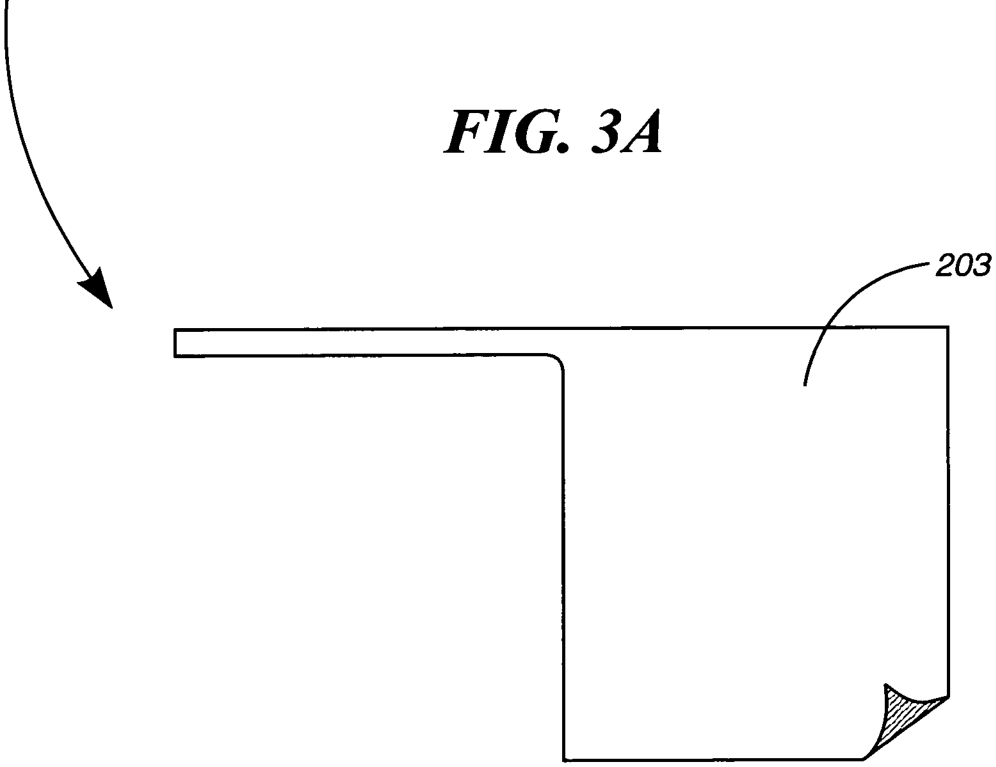
FIG. 3B shows a removable portion of the bottom ply in one embodiment of the present invention.

Thus, the releasable substrate 305 on the first section of the removable portion 203 of the bottom ply 202 contacts and releasably adheres to the adhesive 304 on the second side of the top ply (i.e. inner side of the top ply) 102. As the removable portion 203 of the bottom ply 202 is pulled off of the top ply 102, the releasable substrate 305 on the second side of the bottom ply (backside of the bottom ply) of the removable portion 203 releases from the adhesive 304 on the second side of the top ply (i.e. inner side of the top ply) 102. This allows the removable portion 203 to be removed easily when pulled such that the releasable substrate 305 on the first section of the removable portion 203 releases from the adhesive 304 on the second side of the top ply (i.e. inner side of the top ply) 102. FIG. 3B shows the removable portion 203 of the bottom ply 202 in one embodiment of the present invention. FIG. 3B shows the removable portion 203 after it has been removed from the self-mailer 300.

Figure 4:
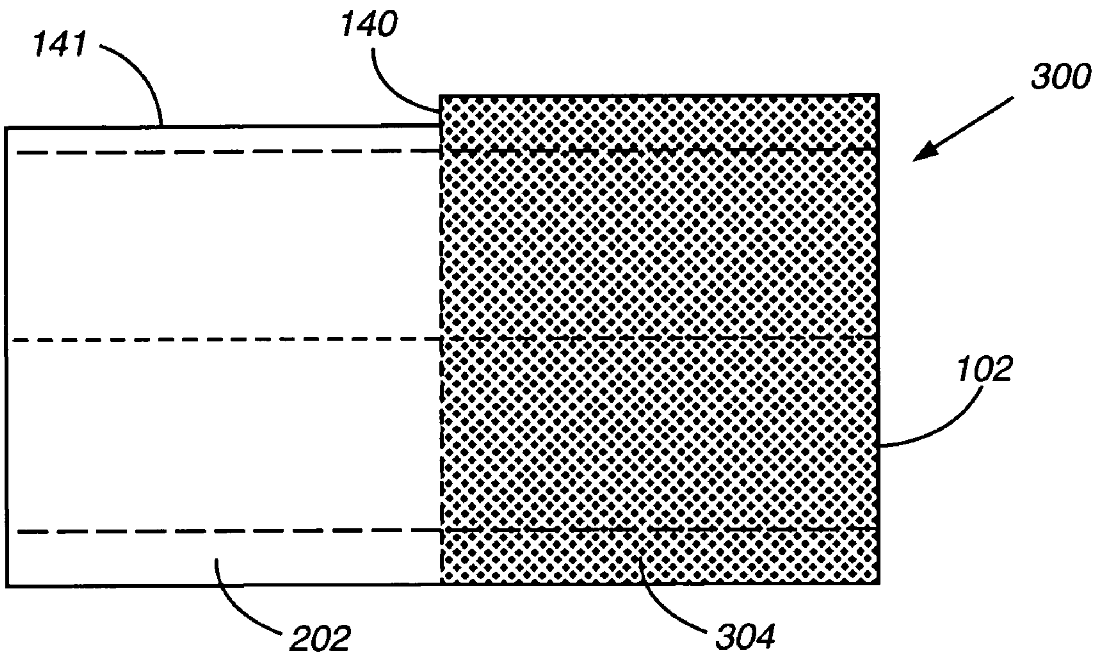
FIG. 4 shows the remaining portion of the bottom ply of the mailing form after removal of the removable portion of the bottom ply in one embodiment of the present invention.

FIG. 4 shows the second side of the bottom ply (i.e. backside of the bottom ply) of the mailing form 300 after removal of the removable portion 203 of the second side of the bottom ply 202 (i.e. the backside of the bottom ply) in one embodiment of the present invention. FIG. 4 shows that after removal of the removable portion 203 of the second side of the bottom ply 202 (i.e. backside of the bottom ply), a portion of the second side of the top ply (i.e. inner side of the top ply) 102, including the adhesive 304, is exposed. Note that a portion of the bottom ply 202 has not been removed and is still present.

FIG. 4 also shows that horizontal strip 145 of the top ply 102 has been removed along with the removable portion 203 of the bottom ply 202. Horizontal strip 145 is located in the top ply 102, bounded by die cut 141 and by die cut 140. When the top ply 102 is placed on top of bottom ply 202, die cut 205 is collinear with die cut 141. The removable portion 203 of the bottom ply 202 is coupled with the horizontal strip 145 via adhesive or the like. When the removable portion 203 of the bottom ply 202 is removed, the horizontal strip 145, being coupled to the removable portion 203 and being detached from the rest of the top ply 102, is removed along with the removable portion 203.

Figure 5A:
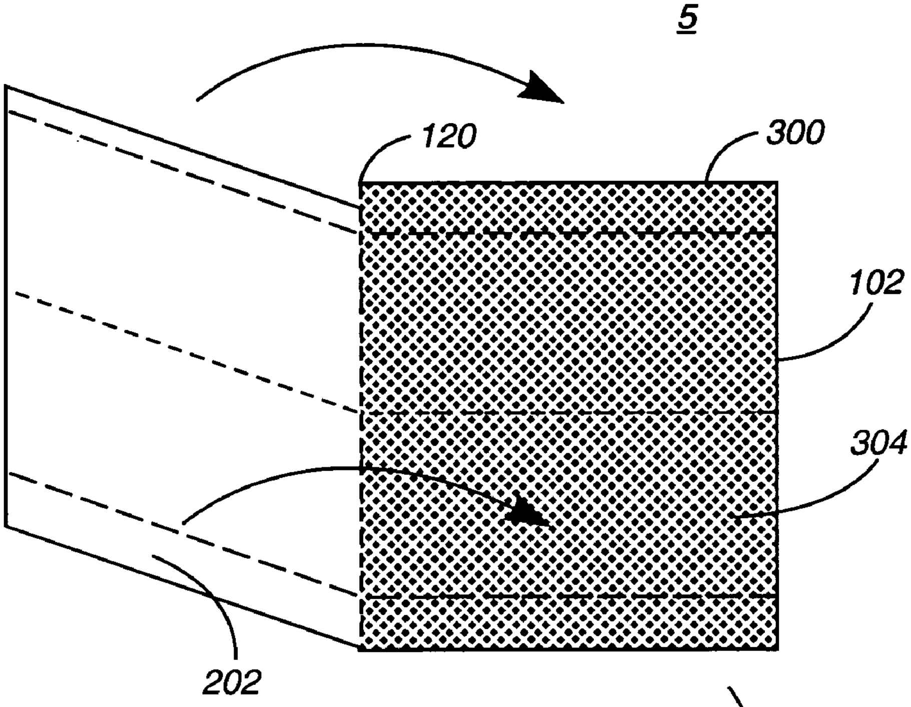
FIG. 5A shows the second side of the bottom ply (i.e. backside of the bottom ply of the mailing form during a first folding action in one embodiment of the present invention.

FIG. 5A shows the second side of the bottom ply (i.e. backside of the bottom ply) of the mailing form 300 during a first folding action in one embodiment of the present invention. FIG. 5A shows the self-mailer 300 being folded for mailing. FIG. 5A shows that the self-mailer 300 is folded along vertical fold line 120 such that the second side of the second ply of the left side of self-mailer 300 meets the second side of the top ply of the right side of self-mailer 300. Upon folding, note that the right side of the second side of the top ply 102 is lined with an adhesive 304. Thus, when the self-mailer 300 is folded along vertical fold line 120, the adhesive 304 contacts and adheres to corresponding areas in the opposing face. Namely, the adhesive 304 on the right side of the top ply 102 contacts and adheres to corresponding areas in the left side of the bottom ply 202.

Figure 5B:
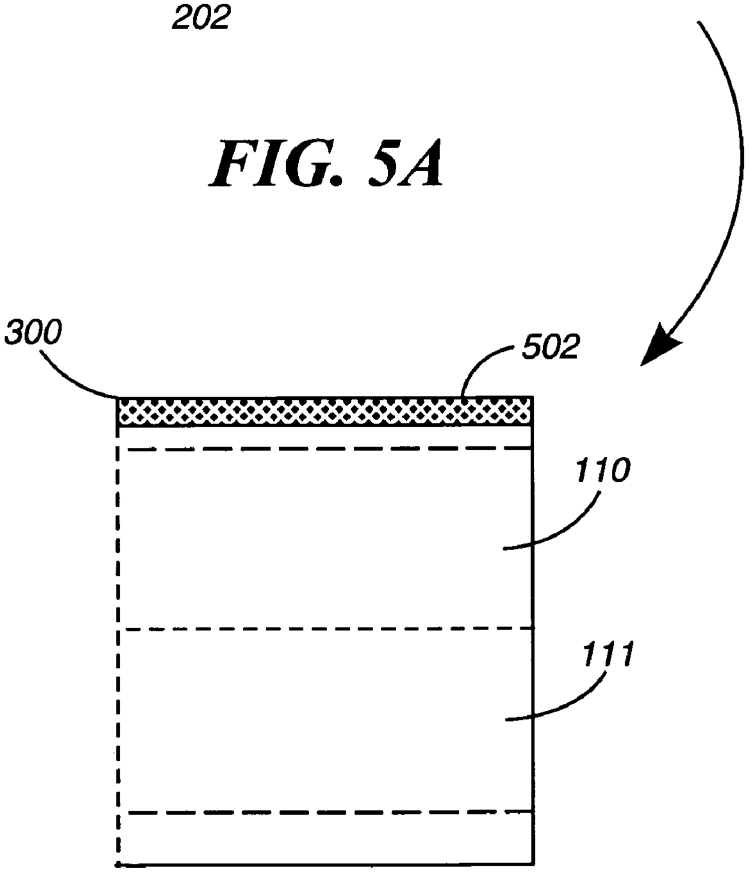
FIG. 5B shows the mailing form after the first folding action in one embodiment of the present invention.

The result of the folding action of FIG. 5A is shown in FIG. 5B. FIG. 5B shows the mailing form 300 after the first folding action in one embodiment of the present invention. FIG. 5B shows that after folding along the vertical fold line 120, the areas 110 and 111 are exposed. In one embodiment of the present invention, document information can be printed in areas 110 and 111. FIG. 5B also shows that a horizontal strip 502 including adhesive 304 is also exposed due to the removal of the horizontal strip 145, as described with reference to FIG. 4 above.

Figure 6A:
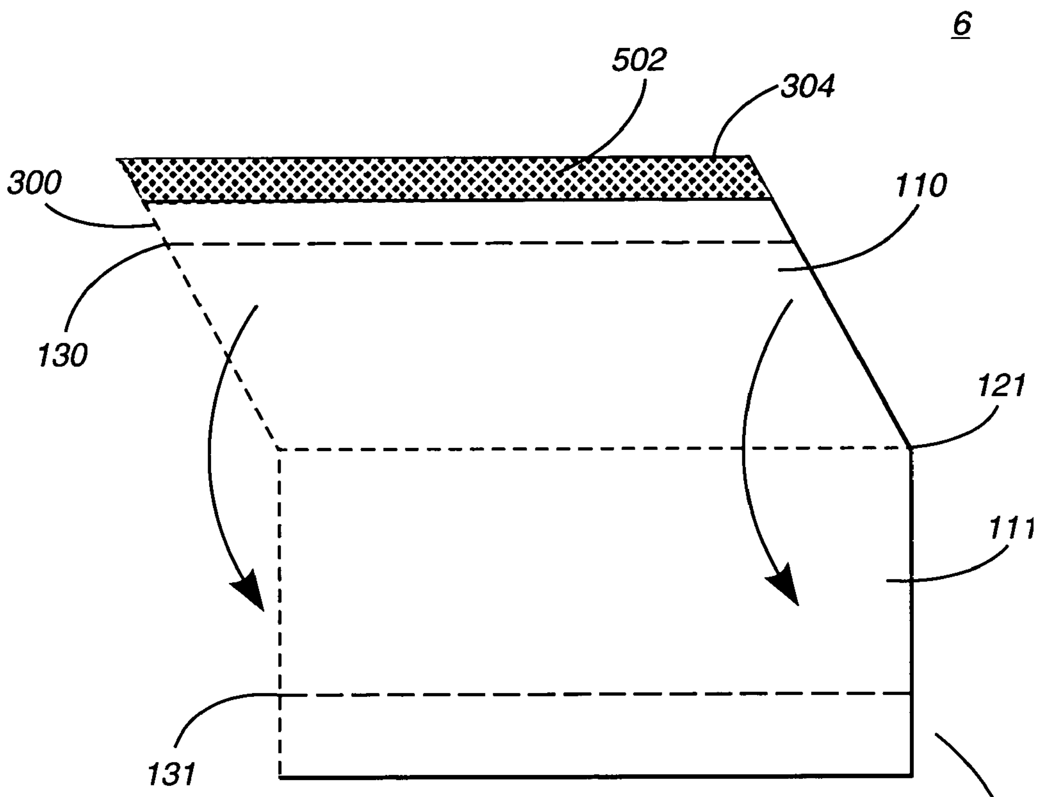
FIG. 6A shows the mailing form during a second folding action in one embodiment of the present invention.

FIG. 6A shows the mailing form 300 during a second folding action in one embodiment of the present invention. FIG. 6A shows the self-mailer 300 being further folded for mailing. FIG. 6A shows that the self-mailer 300 is folded along horizontal fold line 121 such that the area 110 of self-mailer 300 meets the area 111 of self-mailer 300. Upon folding, note that the horizontal strip 502 is lined with an adhesive 304. Thus, when the self-mailer 300 is folded along horizontal fold line 121, the adhesive 304 contacts and adheres to corresponding areas in the opposing face. Namely, the adhesive 304 on the horizontal strip 502 contacts and adheres to corresponding areas below the perforation 131 of the top ply 102.

Figure 6B:
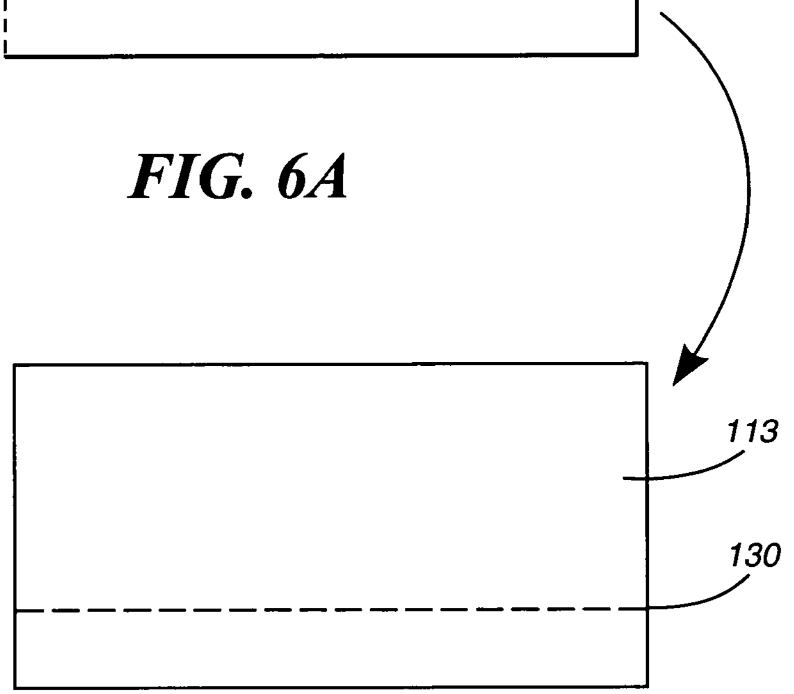
FIG. 6B shows the mailing form after the second folding action in one embodiment of the present invention.

The result of the folding action of FIG. 6A is shown in FIG. 6B. FIG. 6B shows the mailing form 300 after the second folding action in one embodiment of the present invention. FIG. 6B shows that after folding along the horizontal fold line 121, the area 113 of the top ply 102 is exposed. In one embodiment of the present invention, variable information, such as outgoing postal or mailing address or a receipt address, can be printed in area 113. FIG. 6B also shows that upon folding along the horizontal fold line 121, perforation 130 and 131 are collinear.

The foregoing features of the present invention are advantageous as they result in document information being firmly situated between layers of paper of the top ply 102 and the bottom ply 202. Further, the document information is sealed along the edges by the adhesive 304. This produces a mailer that securely carries document information and is able to survive the rigors of mail processing by the USPS and other entities.

After mailing the completely folded mailing form 300 of FIG. 6B, the mailing form 300 can be opened by the postal carrier or mail carrier by tearing along the perforation 130. Note that upon folding along the horizontal fold line 121, perforation 130 and 131 are collinear. Also note that the adhesive 304 on the horizontal strip 502 contacts and adheres to corresponding areas below the perforation 131 of the top ply 102. Thus, upon tearing along perforations 130 and 131 and discarding the resultant strip, the adhesive on horizontal strip 502 is eliminated. The mailing form 300 can then be opened along the horizontal fold line 121, as shown in FIG. 6A, exposing areas 110 and 111.

Second Embodiment

Figure 7:
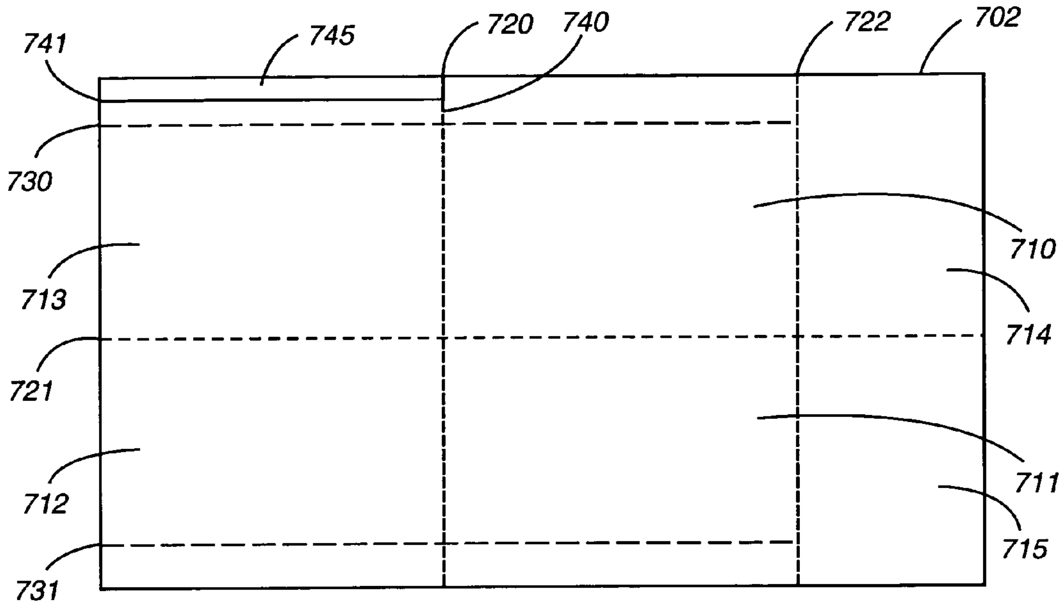
FIG. 7 shows the first side of a top ply of the mailing form in one embodiment of the present invention.

FIG. 7 shows the first side of a top ply 702 of the mailing form, or self-mailer, in a second embodiment of the present invention. FIG. 7 shows that the top ply 702 is a rectangular sheet of paper having dimensions of 8.5×14 inches, for example.

FIG. 7 shows that the top ply 702 includes a vertical fold line 720 running vertically along the top ply 702. FIG. 7 also shows that the top ply 702 includes a horizontal fold line 721 running horizontally along the top ply 702. FIG. 7 further shows that the top ply 702 includes a perforation 722 running vertically near the right edge of the top ply 702. Additionally, FIG. 7 shows that the top ply 702 includes a perforation 730 running along the top edge of the top ply 702 from the left edge of the top ply 702 to the perforation 722 and a perforation 731 running along the bottom edge of the top ply 702 from the left edge of the top ply 702 to the perforation 722.

FIG. 7 further shows that the top ply 702 includes a die cut 741 that runs along the top edge of the top ply 702 from vertical fold line 720 to the left edge of the top ply 702. In addition, the top ply 702 includes a die cut 740 that runs along the vertical fold line 720 from the top of the top ply 702 to the die cut 741. In one embodiment, the fold lines 721 and 720 are perforations.

The fold lines, perforations and die cuts of the top ply 702 create various areas in the first side of the top ply 702. Area 710 is located in the upper portion of the top ply 702, bounded on the top by perforation 730, bounded on the bottom by fold line 721, bounded on the left by fold line 720 and bounded on the right by perforation 722. Area 711 is located in the bottom portion of the top ply 702, bounded on the bottom by perforation 731, bounded on the left by fold line 720, bounded on the top by fold line 721 and bounded on the right by perforation 722. Area 712 is located in the bottom portion of the top ply 702, bounded on the bottom by perforation 731, bounded on the right by fold line 720 and bounded on the top by fold line 721. Area 713 is located in the top portion of the top ply 702, bounded on the bottom by fold line 721, bounded on the right by fold line 720 and bounded on the top by perforation 730.

Area 714 is located in the upper portion of the top ply 702, bounded on the bottom by fold line 721 and bounded on the left by perforation 722. Area 715 is located in the bottom portion of the top ply 702, bounded on the left by perforation 722 and bounded on the top by fold line 721. Horizontal strip 745 is located in the top portion of the top ply 702, bounded on the bottom by die cut 741 and bounded on the right by die cut 740.

In one embodiment of the present invention, document information can be printed in areas 710 and 711. In another embodiment of the present invention, variable information can be printed in areas 712 and 713. In yet another embodiment of the present invention, receipt information can be printed in areas 714 and 715. In this embodiment, the receipt is typically a copy of information that is included in the document information of areas 710 and 711. The receipt is retained by the sender of the mailing form 300 as a “Receipt for Certified Mail” (e.g. United States Postal Form 3800 or equivalent) after being “round stamped” by the receiving postal clerk of the United States Postal Service of the self-mailer that was mailed.

In yet another embodiment of the present invention, postage indicia and FIM are printed in area 712 or 713 near fold line 721, which is away from the edge of the sheet of the top ply 702. Note that the document information printed in the areas 710 and 711, the variable information printed in areas 712 and 713 and the receipt information printed in areas 714 and 715 can be printed in a downwards-facing or in an upwards facing orientation.

The foregoing features of the present invention are advantageous as all printed information is printed on the first side of the top ply 702 and thus it allows the self-mailer to be printed in a typical sheet-fed non-impact printer. Additionally, it allows the postage indicia and FIM to be printed within ⅛ of an inch of the top edge of the self-mailer, as required by the USPS.

Figure 8:
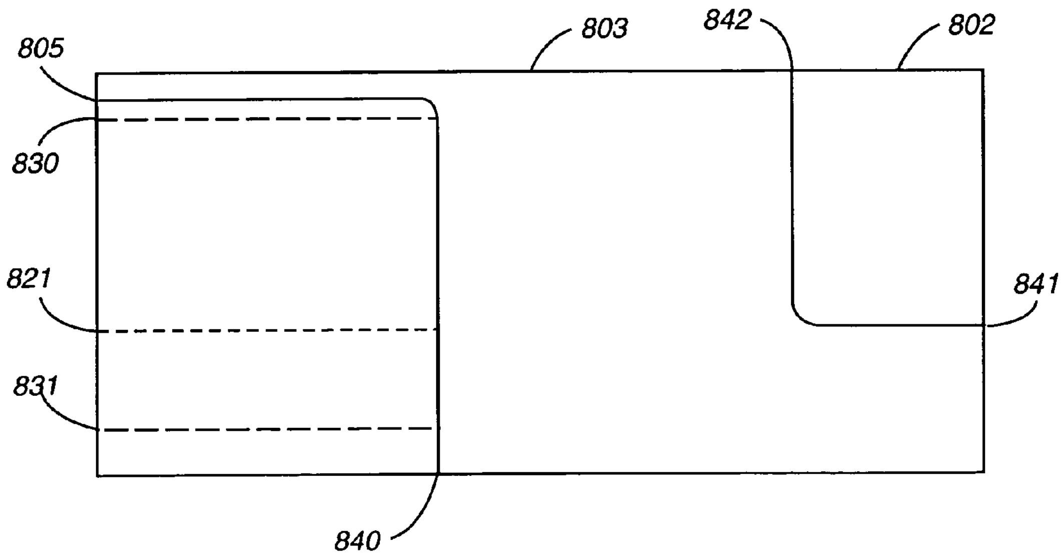
FIG. 8 shows the second side of a bottom ply (i.e. the backside of the bottom ply) of the mailing form in one embodiment of the present invention.

FIG. 8 shows the second side of a second ply 802 (i.e. backside of the bottom ply) of the mailing form in one embodiment of the present invention. The bottom ply 802 is of the same size and constitution as the top ply 702. As shall be seen below, the bottom ply 802 is manufactured for superimposing below, and lining up with, the top ply 702.

FIG. 8 shows a die cut 840 running vertically along the bottom ply 802 and curving to the left to meet the left edge of the bottom ply 802. The horizontal portion of the die cut 840 is referred to as die cut 805. FIG. 8 also shows a die cut 842 running vertically along the bottom ply 802 and curving to the right to meet the right edge of the bottom ply 802. The vertical portion of the die cut is referred to as die cut 842. The horizontal portion of the die cut is referred to as die cut 841.

FIG. 8 also shows a fold line 821 running along the horizontal midsection of the bottom ply 802, starting at the die cut 840 and extending to the left edge of the bottom ply 802. Die cut 841 is collinear with fold line 821. FIG. 8 further shows a perforation 830 running along the top edge of the bottom ply 802, starting at the die cut 840 and extending to the left edge of the bottom ply 802. FIG. 8 further shows a perforation 831 running along the bottom edge of the bottom ply 802, starting at the die cut 840 and extending to the left edge of the bottom ply 802.

Die cuts 840, 841, 805 and 842 bound the area of the removable portion 803 of the bottom ply 802. Because a die cut is a continuous cut of the material that constitutes bottom ply 802, die cuts 840, 841, 805 and 842 effectively disconnect the removable portion 803 from the rest of the bottom ply 802. The removable portion 803 and its functions are described in greater detail below.

When the top ply 702 is superimposed on top of bottom ply 802, the perforation 830 is collinear with the perforation 730, the perforation 831 is collinear with the perforation 731, the fold line 821 is collinear with the fold line 721 and a substantial portion of the die cut 840 is collinear with the fold line 720. Furthermore, die cut 805 is collinear with die cut 741, die cut 841 is collinear with fold line 721 and die cut 842 is collinear with perforation 722.

Figure 9:
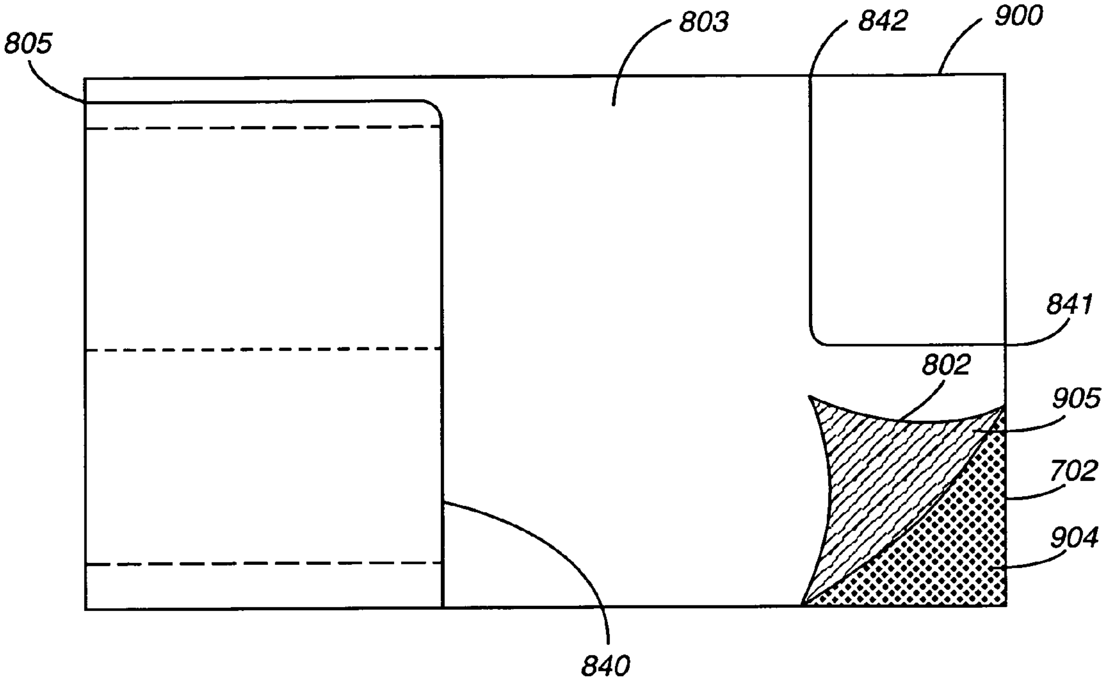
FIG. 9 shows the second side of the bottom ply (i.e. the backside of the bottom ply of the mailing form during removal of the removable portion of the backside of the bottom ply in one embodiment of the present invention.

FIG. 9 shows the second side of the bottom ply (i.e. backside of the bottom ply) of the mailing form 900, or self-mailer, in one embodiment of the present invention. The mailing form 900 comprises the top ply 702 laid on top of the bottom ply 802 such that the first side of the of the bottom ply 802 (inner side of the bottom ply) meets the second side of the top ply (i.e. inner side of the top ply) 702. FIG. 9 shows the second side of the bottom ply 802 (backside of the bottom ply), as the first side of the bottom ply (inner side of the bottom ply) 802 is not visible due to the top ply 702 laying on top of the first side of the bottom ply (inner side of the bottom ply) 802. FIG. 9 also shows the second side of the top ply (i.e. inner side of the top ply) 702, visible only as the bottom ply 802 is peeled off.

As explained above, the die cuts 840, 805, 841 and 842 bound the area of the removable portion 803 of the bottom ply 802. Die cuts 840, 805, 841 and 842 effectively disconnect the removable portion 803 from the rest of the bottom ply 802. FIG. 9 shows that the removable portion 803 of the bottom ply 802 can be removed by peeling the removable portion 803 from the self-mailer 900. The first portion of the removable portion 803 of the bottom ply 802 (i.e., that face of the removable portion 803 that contacts the top ply 702) is coated with a releasable substrate 905 such as silicon. Further, the area of the second side of the top ply (i.e. inner side of the top ply) 702 that contacts the first portion of the removable portion 803 is coated with an adhesive 904.

Thus, the releasable substrate 905 on the first portion of the removable portion 803 of the bottom ply 802 contacts and releasably adheres to the adhesive 904 on the second side of the top ply (i.e. inner side of the top ply) 702. As the removable portion 803 of the bottom ply 802 is pulled off of the top ply 702, the releasable substrate 905 on the second side of the top ply (i.e. inner side of the top ply) of the removable portion 803 releases from the adhesive 904 on the second side of the top ply (i.e. inner side of the top ply) 702. This allows the removable portion 803 to be removed easily when pulled such that the releasable substrate 905 on the first portion of the removable portion 803 releases from the adhesive 904 on the second side of the top ply (i.e. inner side of the top ply) 702.

Figure 11:
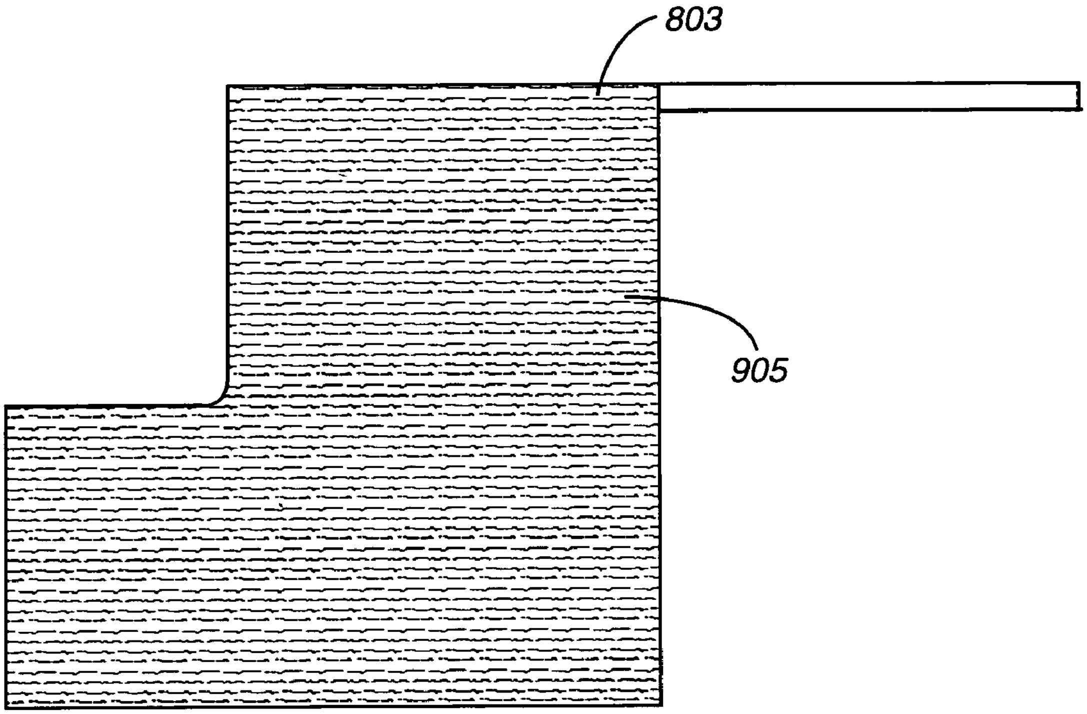
FIG. 11 shows the removable portion of the bottom ply in one embodiment of the present invention.

FIG. 11 shows the removable portion 803 of the bottom ply 802 in one embodiment of the present invention. FIG. 11 shows the removable portion 803 after it has been removed from the self-mailer 900. FIG. 11 also shows the area of the first side of the bottom ply (i.e. the inner side of the bottom ply) of the removable portion 803 that is covered with the releasable substrate 905.

Figure 10:
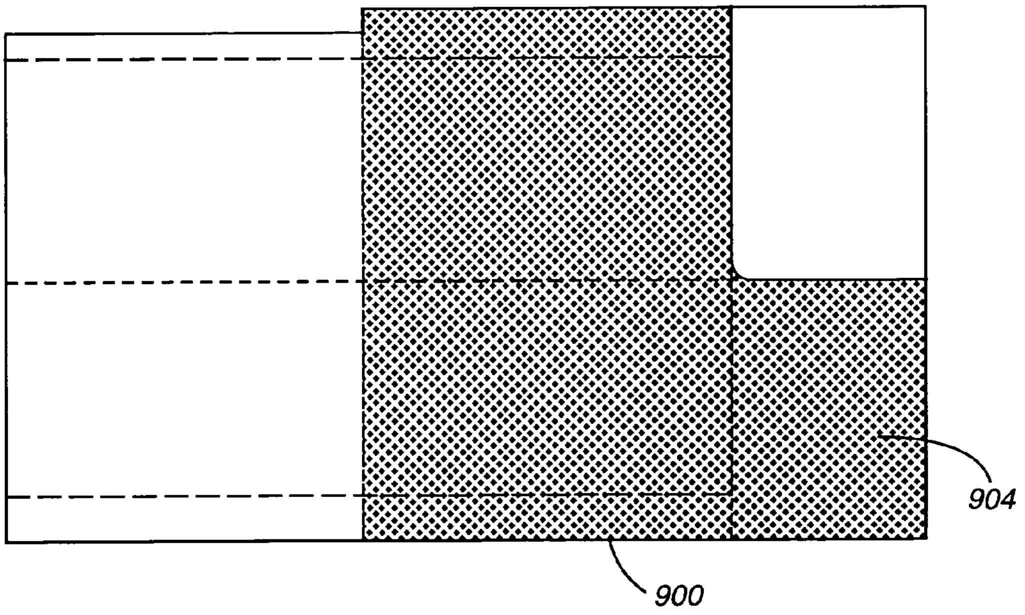
FIG. 10 shows the remaining portion of the bottom ply of the mailing form after removal of the removable portion of the bottom ply in one embodiment of the present invention.

FIG. 10 shows the second side of the bottom ply (i.e. backside of the bottom ply) of the mailing form 900 after removal of the removable portion 803 of the bottom ply 802 in one embodiment of the present invention. FIG. 10 shows that after removal of the removable portion 803 of the bottom ply 802, a portion of the second side of the top ply (i.e. inner side of the top ply) 702, including the adhesive 904, is exposed. Note that portions of the bottom ply 802 have not been removed and are still present.

FIG. 10 also shows that horizontal strip 745 of the top ply 702 has been removed along with the removable portion 803 of the bottom ply 802. Horizontal strip 745 is located in the top ply 702, bounded by die cut 741 and by die cut 740. When the top ply 702 is superimposed on top of bottom ply 802, die cut 805 is collinear with die cut 741. The removable portion 803 of the bottom ply 802 is coupled with the horizontal strip 745 via adhesive or the like. When the removable portion 803 of the bottom ply 802 is removed, the horizontal strip 745, being coupled to the removable portion 803 and being detached from the rest of the top ply 702, is removed along with the removable portion 803.

Figure 12:
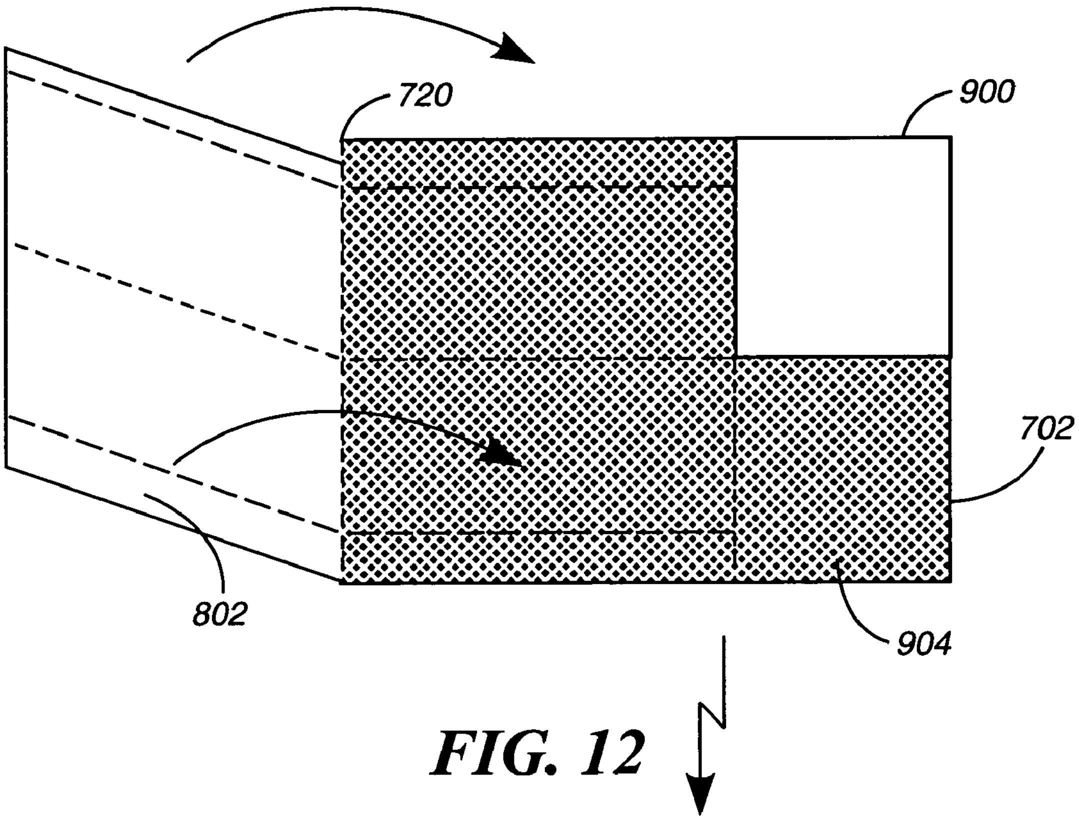
FIG. 12 shows the second side of the bottom ply (i.e. backside of the bottom ply) of the mailing form during a first folding action in one embodiment of the present invention.

FIG. 12 shows the second side of the bottom ply (i.e. backside of the bottom ply) of the mailing form 900 during a first folding action in one embodiment of the present invention. FIG. 12 shows the self-mailer 900 being folded for mailing. FIG. 12 shows that the self-mailer 900 is folded along vertical fold line 720 such that the second side of the left side of self-mailer 900 meets the second side of the right side of self-mailer 900. Upon folding, note that the right side of the second side of the top ply 702 is lined with an adhesive 904. Thus, when the self-mailer 900 is folded along vertical fold line 720, the adhesive 904 contacts and adheres to corresponding areas in the opposing face. Namely, the adhesive 904 on the right side of the top ply 702 contacts and adheres to corresponding areas in the left side of the bottom ply 802.

Figure 13:
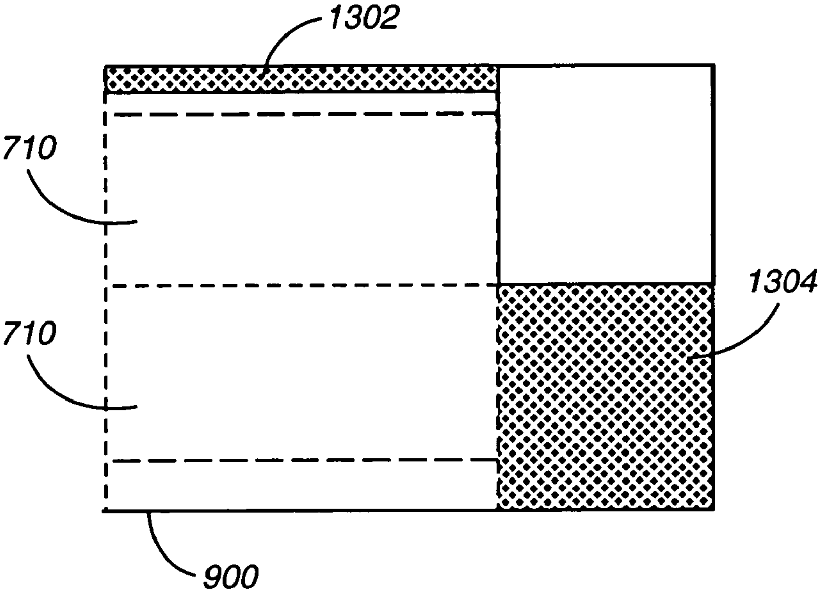
FIG. 13 shows the mailing form after the first folding action in one embodiment of the present invention.

The result of the folding action of FIG. 12 is shown in FIG. 13. FIG. 13 shows the mailing form 900 after the first folding action in one embodiment of the present invention. FIG. 13 shows that after folding along the vertical fold line 720, the areas 710 and 711 are exposed. In one embodiment of the present invention, document information can be printed in areas 710 and 711. FIG. 13 also shows that a horizontal strip 1302 including adhesive 904 is also exposed due to the removal of the horizontal strip 745, as described with reference to FIG. 10 above.

Figure 14:
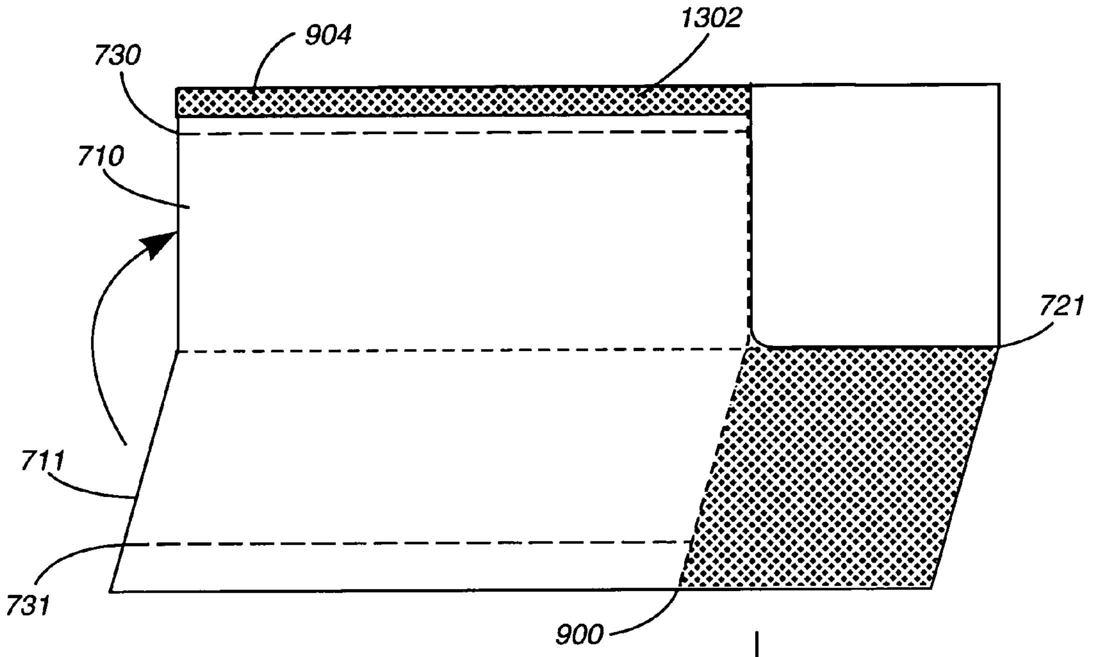
FIG. 14 shows the mailing form during a second folding action in one embodiment of the present invention.

FIG. 14 shows the mailing form 900 during a second folding action in one embodiment of the present invention. FIG. 14 shows the self-mailer 900 being further folded for mailing. FIG. 14 shows that the self-mailer 900 is folded along horizontal fold line 721 such that the area 710 of self-mailer 900 meets the area 711 of self-mailer 900. Upon folding, note that the horizontal strip 1302 is lined with an adhesive 904. Thus, when the self-mailer 900 is folded along horizontal fold line 721, the adhesive 904 contacts and adheres to corresponding areas in the opposing face. Namely, the adhesive 904 on the horizontal strip 1302 contacts and adheres to corresponding areas below the perforation 731 of the top ply 702.

Figure 15:
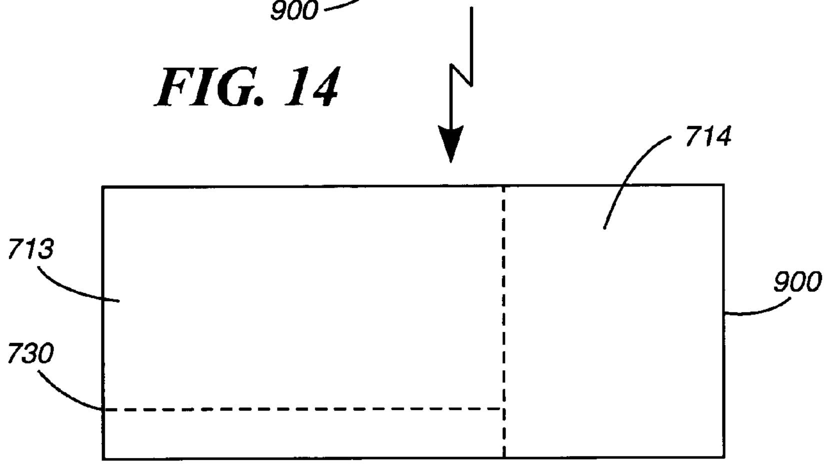
FIG. 15 shows the mailing form after the second folding action in one embodiment of the present invention.

The result of the folding action of FIG. 14 is shown in FIG. 15. FIG. 15 shows the mailing form 900 after the second folding action in one embodiment of the present invention. FIG. 15 shows that after folding along the horizontal fold line 721, the area 713 of the top ply 702 is exposed. In one embodiment of the present invention, variable information can be printed in area 713. FIG. 15 also shows that upon folding along the horizontal fold line 721, perforation 730 and 731 are collinear.

The foregoing features of the present invention are advantageous as they result in document information being firmly situated between layers of paper of the top ply 702 and the bottom ply 802. Further, the document information is sealed along the edges by the adhesive 904. This produces an envelope that securely carries document information and is able to survive the rigors of mail processing by the USPS and other entities.

Figure 16:
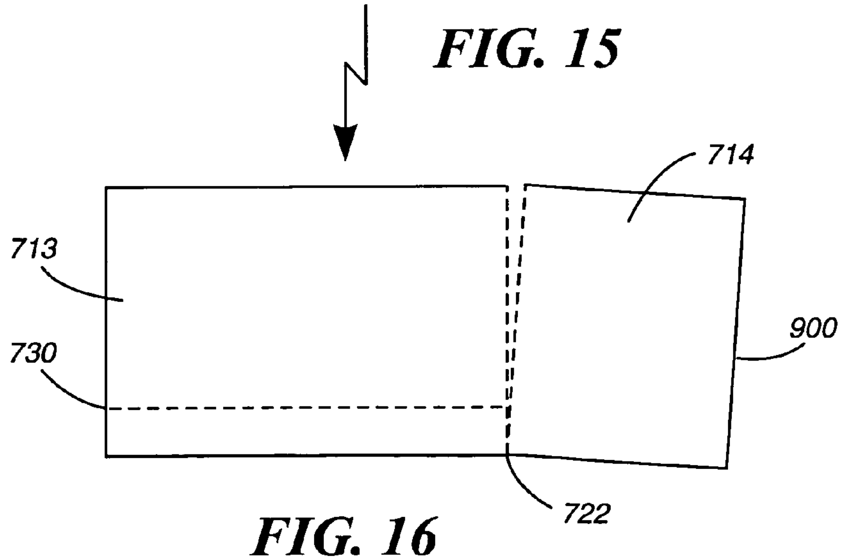
FIG. 16 shows the mailing form during removal of a receipt in one embodiment of the present invention.

FIG. 16 shows the mailing form 900 during removal of a receipt in one embodiment of the present invention. FIG. 16 shows that upon folding along fold line 721, the perforation 722 folds onto itself, allowing a postal clerk of the United States Postal Office of the self-mailer 900 to tear the perforation 722 so as to detach the areas 714 and 715, which may contain receipt information and handed back to the sender.

After mailing the completely folded mailing form 900 of FIG. 15, the mailing form 900 can be opened by the delivering postal carrier or mail carrier by tearing along the perforation 730. Note that upon folding along the horizontal fold line 721, perforation 730 and 731 are collinear. Also note that the adhesive 904 on the horizontal strip 1302 contacts and adheres to corresponding areas below the perforation 731 of the top ply 702. Thus, upon tearing along perforations 730 and 731 and discarding the resultant strip, the adhesive on horizontal strip 1302 is eliminated. The mailing form 900 can then be separated along the horizontal fold line 721, as shown in FIG. 16, exposing areas 710 and 711.

Third Embodiment

Figure 17:
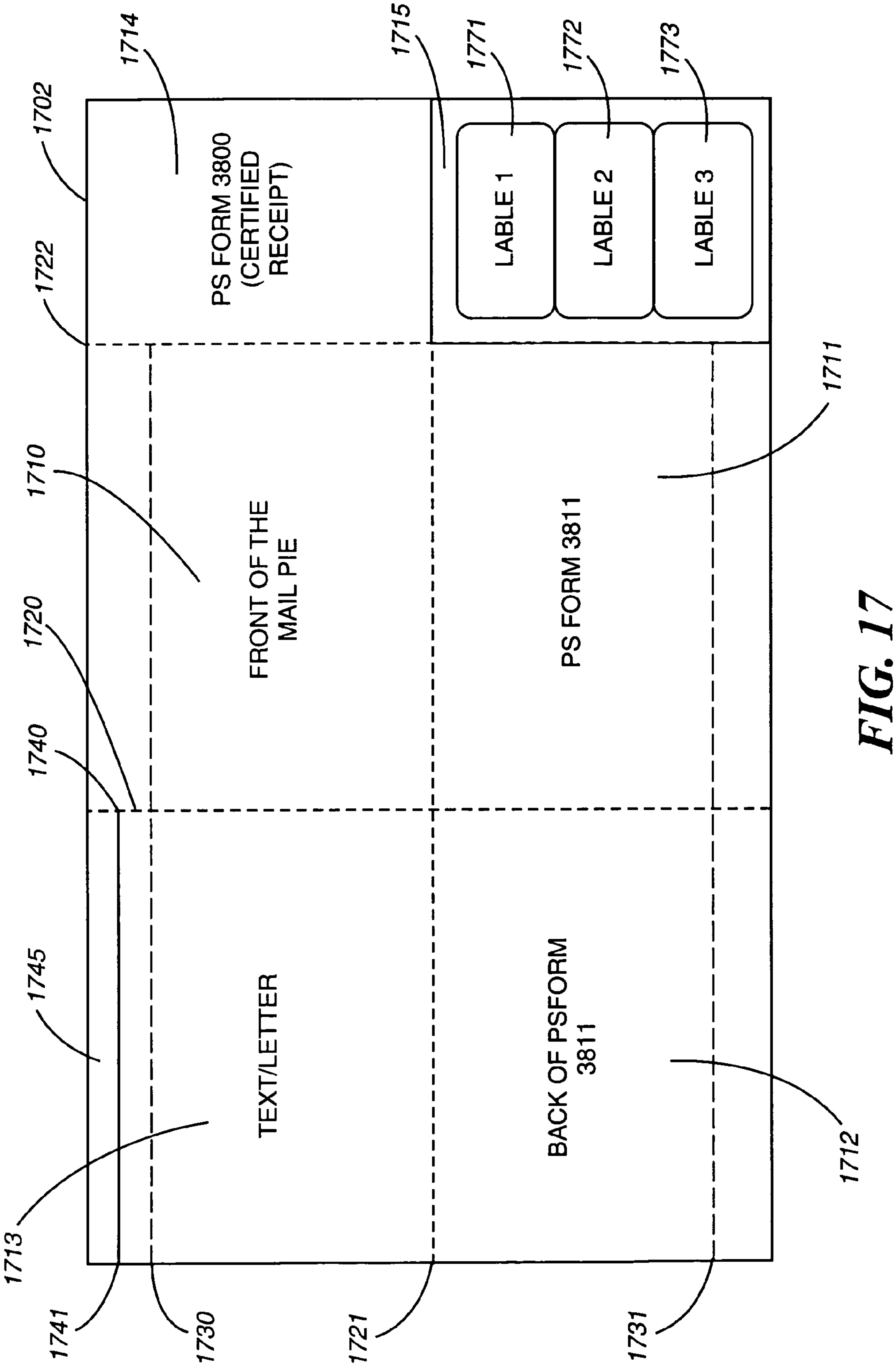
FIG. 17 shows another embodiment of the first side of a top ply of the mailing form in one embodiment of the present invention.

FIG. 17 shows another embodiment of the first side of a top ply 1702 of the mailing form, or self-mailer, in a third embodiment of the present invention. FIG. 17 is an alternative embodiment of the item depicted in FIG. 7. FIG. 17 shows that the top ply 1702 is a rectangular sheet of paper having dimensions of 8.5×14 inches, for example.

FIG. 17 shows that the top ply 1702 includes a vertical fold line 1720 running vertically along the top ply 1702. FIG. 17 also shows that the top ply 1702 includes a horizontal fold line 1721 running horizontally along the top ply 1702. FIG. 17 further shows that the top ply 1702 includes a perforation 1722 running vertically near the right edge of the top ply 702. Additionally, FIG. 17 shows that the top ply 1702 includes a perforation 1730 running along the top edge of the top ply 1702 from the left edge of the top ply 1702 to the perforation 1722 and a perforation 1731 running along the bottom edge of the top ply 1702 from the left edge of the top ply 1702 to the perforation 1722.

FIG. 17 further shows that the top ply 1702 includes a die cut 1741 that runs along the top edge of the top ply 1702 from vertical fold line 1720 to the left edge of the top ply 1702. In addition, the top ply 1702 includes a die cut 1740 that runs along the vertical fold line 1720 from the top of the top ply 1702 to the die cut 1741. In one embodiment, the fold lines 1721 and 1720 are perforations.

The fold lines, perforations and die cuts of the top ply 1702 create various areas in the first side of the top ply 1702. Area 1710 is located in the upper portion of the top ply 1702, bounded on the top by perforation 1730, bounded on the bottom by fold line 1721, bounded on the left by fold line 1720 and bounded on the right by perforation 1722. Area 1711 is located in the bottom portion of the top ply 1702, bounded on the bottom by perforation 1731, bounded on the left by fold line 1720, bounded on the top by fold line 1721 and bounded on the right by perforation 1722. Area 1712 is located in the bottom portion of the top ply 1702, bounded on the bottom by perforation 1731, bounded on the right by fold line 1720 and bounded on the top by fold line 1721. Area 1713 is located in the top portion of the top ply 1702, bounded on the bottom by fold line 1721, bounded on the right by fold line 1720 and bounded on the top by perforation 1730.

Area 1714 is located in the upper portion of the top ply 1702, bounded on the bottom by fold line 1721 and bounded on the left by perforation 1722. Area 1715 is located in the bottom portion of the top ply 1702, bounded on the left by perforation 1722 and bounded on the top by fold line 1721. Horizontal strip 1745 is located in the top portion of the top ply 1702, bounded on the bottom by die cut 1741 and bounded on the right by die cut 1740.

In one embodiment of the present invention, document information can be printed in areas 1710 and 1711. In another embodiment of the present invention, variable information can be printed in areas 1712 and 1713. In yet another embodiment of the present invention, receipt information can be printed in areas 1714 and 1715. In this embodiment, the receipt is typically a copy of information that is included in the document information of areas 1710 and 1711. The receipt is retained by the sender of the mailing form 3800 as a "Receipt for Certified Mailing" (e.g. United States Postal Form 3800 or equivalent) after being "round stamped" by the receiving postal clerk of the United States Postal Service of the self-mailer that was mailed.

In yet another embodiment of the present invention, postage indicia and FIM are printed in area 1712 or 1713 near fold line 1721, which is away from the edge of the sheet of the top ply 1702. Note that the document information printed in the areas 1710 and 1711, the variable information printed in areas 1712 and 1713 and the receipt information printed in areas 1714 and 1715 can be printed in a downwards-facing or in an upwards facing orientation.

FIG. 17 further shows labels 1771, 1772 and 1773 in area 1715. These labels can be used to print recipient address data, sender address data, postage, or any other information that can be printed onto a label and used in conjunction with the self-mailer or otherwise. Note that each label is generated by a closed die cut that encircles or encompasses the label.

Figure 18:
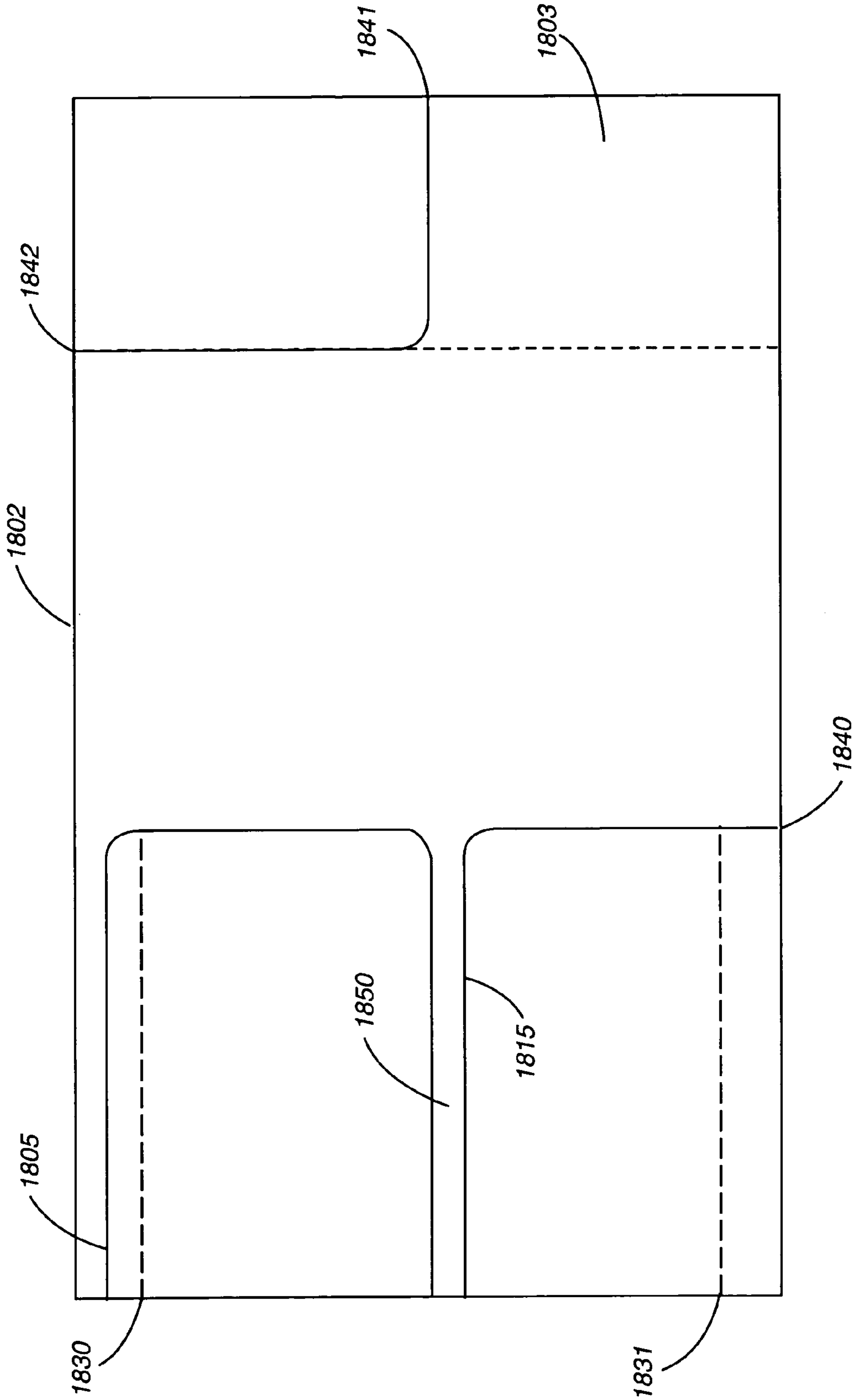
FIG. 18 shows another embodiment of the second side of a bottom ply (i.e. the backside of the bottom ply) of the mailing form in one embodiment of the present invention.

FIG. 18 shows another embodiment of the second side of a bottom ply 1802 of the mailing form in a third embodiment of the present invention. FIG. 18 is an alternative embodiment of the item depicted in FIG. 8. The bottom ply 1802 is of the same size and constitution as the top ply 1702. As shall be seen below, the bottom ply 1802 is manufactured for superimposing below, and lining up with, the top ply 1702.

FIG. 18 shows a die cut 1840 running vertically along the bottom ply 1802 and curving to the left to meet the left edge of the bottom ply 1802. The horizontal portion of the die cut 1840 is referred to as die cut 1815. FIG. 18 also shows a die cut 1842 running vertically along the bottom ply 1802 and curving to the right to meet the right edge of the bottom ply 1802. The vertical portion of the die cut is referred to as die cut 1842. The horizontal portion of the die cut is referred to as die cut 1841. FIG. 18 also shows a die cut 1805 that starts at the left edge of the bottom ply 1802 extends out onto the self mailer and returns to the left edge of the bottom ply 1802. A strip 1850 consists of a strip of ply that is formed from the die cuts 1805 and 1815.

FIG. 18 further shows a perforation 1830 running along the top edge of the bottom ply 1802, starting at the die cut 1840 and extending to the left edge of the bottom ply 1802. FIG. 18 further shows a perforation 1831 running along the bottom edge of the bottom ply 1802, starting at the die cut 1840 and extending to the left edge of the bottom ply 1802.

Die cuts 1840, 1841, 1815, 1805 and 1842 bound the area of the removable portion 1803 of the bottom ply 1802. Because a die cut is a continuous cut of the material that constitutes bottom ply 1802, die cuts 1840, 1841, 1815, 1805 and 1842 effectively disconnect the removable portion 1803 from the rest of the bottom ply 1802. The removable portion 1803 and its functions are described in greater detail above.

When the top ply 1702 is superimposed on top of bottom ply 1802, the perforation 1830 is collinear with the perforation 1730, the perforation 1831 is collinear with the perforation 1731, the strip 1850 is collinear with the fold line 1721 and a substantial portion of the die cut 1840 is collinear with the fold line 1720. Furthermore, die cut 1805 is collinear with die cut 1741, die cut 1841 is collinear with fold line 1721 and die cut 1842 is collinear with perforation 1722.

It should be noted that the difference between the item depicted in FIG. 8 and the item depicted in FIG. 18 is the presence of the strip 1850 in the mailer of FIG. 18, which is not present in the mailer of FIG. 8. When the removable portion 1803 of the bottom ply 1802 is removed, this exposes the top ply 1702. The strip 1850 is integrated with the removable portion 1803 and is thus removed when the removable portion 1803 is removed. Note that strip 1850 covers the midline of the self mailer, under which fold line 1721 of FIG. 17 is located. The advantage of strip 1850 is that upon removal of the removable portion 1803, the fold line 1721 is exposed and allows for easier folding of the self mailer. Folding is inherently easier when one piece of paper (or one ply) is folded, as opposed to two pieces of paper (or two ply).

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A mailing form for facilitating a mailing of a document, comprising:

a bottom ply of the mailing form with a first side and a second side;

a top ply of the mailing form with a first side and a second side, wherein the second side of the top ply is located over and facing the first side of the bottom ply;

an adhesive interspersed between at least a portion of the first side of the bottom ply and at least a portion of the second side of the top ply;

a removable portion of the bottom ply extending over the second side of the top ply, such that removal of the removable portion exposes the adhesive;

document information printed on at least a portion of the first side of the top ply;

a vertical fold line for folding the mailing form after the removable portion of bottom ply has been removed away from the top ply, the adhesive securing the mailing form when folded along the vertical fold line;

a horizontal strip located on the second side of the top ply, the horizontal strip including adhesive that is exposed after the mailing form is folded along the vertical fold line;

a horizontal fold line for folding the mailing form that has been folded along the vertical fold line, the adhesive of the horizontal strip securing the mailing form when folded along the horizontal fold line;

a first perforation along a top margin of the top ply and the bottom ply; wherein when the mailing form is in folder configuration, the document information is firmly situated within the mailing form; and a second perforation along the bottom margin of the top ply and the bottom ply, such that the first perforation and the second perforation can be torn when the mailing form is in folder configuration, such that the mailing form can be unfolded along the horizontal fold line.

2. The mailing form of claim 1, wherein the first side of the bottom ply includes a releasable substrate.

3. The mailing form of claim 1, wherein when the removable portion of the bottom ply is removed, a horizontal strip of the top ply located on a first portion of the top ply is removed.

4. The mailing form of claim 1, wherein the document is at least one of:

a letter;

a registered mail;

a certified mail receipt;

a certified mail postcard;

a notice; and an announcement.

5. The mailing form of claim 1, wherein the mailing form is adapted for printing in a single pass through a sheet-fed, simplex, non-impact printer.

6. The mailing form of claim 1, wherein the second side of the bottom ply includes variable information.

7. The mailing form of claim 6, wherein the variable information includes a sender address, a recipient address and postage indicia.

8. The mailing form of claim 6, wherein the variable information is printed in an upward-facing orientation.

9. The mailing form of claim 6, wherein the variable information is printed in a downward-facing orientation.

10. The mailing form of claim 1, further comprising:

a third perforation in a vertical orientation along a right margin of the top ply and the bottom ply, wherein the third perforation may be torn to produce a strip from the mailing form, the strip being used as a mail receipt.

11. The mailing form of claim 10, wherein the mailing form is a United States Postal Service Form 3811 and the strip is a United States Postal Service Form 3800.

12. The mailing form of claim 1, further comprising:

at least one area of the first side of the top ply including at least one closed die cut so as to produce a label on which variable information may be printed.

* * * * *